(12) United States Patent
Cornelius (10) Patent No.: US 7,523,057 B1
(45) Date of Patent: Apr. 21, 2009

(54) TRANSFERRING FUNDS TO DESIGNATED ACCOUNTS THROUGH THE USE OF A MONEY MANAGEMENT CARD

(75) Inventor: Harry Cornelius, Palm Beach, FL (US)

(73) Assignee: Cornelius Marketing, Palm Beach, FL (US)

( * ) Notice: Subject to any disclaimer, the term of this patent is extended or adjusted under 35 U.S.C. 154(b) by 488 days.

(21) Appl. No.: 11/153,927

(22) Filed: Jun. 16, 2005

Related U.S. Application Data (63) Continuation-in-part of application No. 10/122,763, filed on Apr. 15, 2002.

(60) Provisional application No. 60/284,173, filed on Apr. 17, 2001.

(51) Int. Cl.
G06Q 40/00 (2006.01)

(52) U.S. Cl. ........................................ 705/35

(58) Field of Classification Search ............... None
See application file for complete search history.

(56) References Cited

U.S. PATENT DOCUMENTS

| | | | |
|---|---|---|---|
| 4,742,457 A | 5/1988 | Leon et al. | |
| 4,751,640 A | 6/1988 | Lucas et al. | |
| 5,056,019 A | 10/1991 | Schultz et al. | |
| 5,200,889 A | 4/1993 | Mori | |
| 5,206,803 A | 4/1993 | Vitagliano et al. | |
| 5,287,268 A | 2/1994 | McCarthy | |
| 5,787,404 A * | 7/1998 | Fernandez-Holmann | 705/35 |
| 5,878,405 A | 3/1999 | Grant et al. | |
| 5,946,669 A | 8/1999 | Polk | |
| 5,949,044 A | 9/1999 | Walker et al. | |
| 5,956,700 A | 9/1999 | Landry | |
| 6,012,048 A | 1/2000 | Gustin et al. | |
| 6,016,482 A | 1/2000 | Molinari et al. | |
| 6,032,135 A | 2/2000 | Molano et al. | |
| 6,070,153 A * | 5/2000 | Simpson | 705/36 R |
| 6,092,052 A | 7/2000 | Ziarno | |
| 6,112,191 A | 8/2000 | Burke et al. | |
| 6,173,269 B1 | 1/2001 | Solokl et al. | |
| 6,185,544 B1 | 2/2001 | Sakamoto et al. | |
| 6,202,054 B1 | 3/2001 | Lawlor et al. | |
| 6,216,115 B1 | 4/2001 | Barrameda et al. | |
| 6,592,030 B1 * | 7/2003 | Hardesty | 235/380 |
| 6,631,358 B1 * | 10/2003 | Ogilvie | 705/39 |
| 6,663,002 B2 * | 12/2003 | Glaser | 705/36 R |
| 7,072,851 B1 * | 7/2006 | Wilcox et al. | 705/14 |
| 7,313,543 B1 * | 12/2007 | Crane et al. | 705/39 |
| 2001/0032157 A1 * | 10/2001 | Dannenberg et al. | 705/36 |
| 2002/0111904 A1 * | 8/2002 | Gruber et al. | 705/39 |

* cited by examiner

*Primary Examiner*—Hani Kazimi
*Assistant Examiner*—Michael R Zecher
(74) *Attorney, Agent, or Firm*—Workman Nydegger (57) ABSTRACT

A money management card adapted to provide a method of saving and investing for a user of the money management card. An entity, such as, for example, a card issuer, receives a user designation of one or more designated accounts that are to receive at least a portion of any additional amount added to purchases made using the money management card. The entity receives an indication that a user has used the money management card to make a purchase for a specified purchase amount subsequent to receiving the user designation. The entity adds a calculated additional amount to the specified purchase amount, for example, based on the fact a purchase was made or based at least in part on the specified purchase amount. The entity transfers an appropriate portion of the calculated additional amount to each of the one or more designated accounts. Third parties can also transfer matching funds that match at least a portion of the calculated additional amount.

30 Claims, 8 Drawing Sheets

TRANSFERRING FUNDS TO DESIGNATED ACCOUNTS THROUGH THE USE OF A MONEY MANAGEMENT CARD

RELATED APPLICATIONS

This application is a continuation-in-part of U.S. patent application Ser. No. 10/122,763, filed Apr. 15, 2002, entitled "Method and System for Saving and Investing Through Use of a Money Management Card and Pooled Investment Accounts", which is herein incorporated by reference in its entirety. That application claims priority to U.S. Provisional Patent Application Ser. No. 60/284,173, filed on Apr. 17, 2001, entitled "Money Management Using A Card", which is also herein incorporated by reference in its entirety.

BACKGROUND OF THE INVENTION

1. The Field of the Invention

The present invention extends to both methods and systems for using a money management card. In particular, the present invention relates to a money management card providing (potentially automated) transfer of funds to one or more designated accounts. The money management card and various accounts are adapted to transfer a user's funds subsequent to, and potentially in response to, the user using the money management card.

2. Background and Relevant Art

The use of money management cards that allow a user to make purchases is an important aspect of modern commerce. The credit card industry provides vast amounts of credit to consumers and business alike to facilitate the purchase of goods, services, and other necessities using money management cards. Money management cards can include a variety of cards including, but not limited to, credit cards, automated teller machine (ATM) cards, check cards, and the like.

In recent years, the financial industry has expanded the use of money management cards beyond simply providing a means of making purchases. Money management cards have been utilized in a variety of roles including airline frequent flier programs, cash back incentives, and discount programs. These programs typically represent incentive programs adapted to encourage card users to use the money management card for purchases. The issuer of the card, at times in connection with other merchants, subsidizes the incentive programs with revenue generated from the credit card business. The subsidies are offered as a benefit of membership and are often linked to the amount of purchases made using the card.

Notwithstanding the incentive offered by such cards, credit card spending is typically associated with lessening of a user's assets. When the user makes purchases using a money management card, the user is spending financial assets to make purchases of goods, services, or other necessities. Though some cash back and investment mechanisms associated with money management cards provide a method of receiving a return of a portion of all purchases made using the card, typically such mechanisms are offered merely as a promotion. However, these mechanisms do not provide a meaningful method of saving or investing the user's assets or any way to transfer additional funds (above a purchase price) to other designated accounts. Additionally, investment mechanisms associated with money management cards that provide access to investment instruments typically require that the user satisfy dollar minimums associated with the investment instruments.

BRIEF SUMMARY OF THE INVENTION

The present invention extends to both methods and systems for utilizing a money management card. In particular, the present invention relates to transferring funds to designated accounts through the use of a money management card. An entity, such as, for example, a card issuer, receives a user designation of one or more designated accounts that are to receive at least a portion of any additional amount added to purchases made using the money management card. The entity receives an indication that a user has used the money management card to make a purchase for a specified purchase amount subsequent to receiving the user designation. The calculated additional amount can be based at least in part on the specified purchase amount or can be a pre-calculated amount that is added based on the fact a purchase was made. The entity transfers an appropriate portion of the calculated additional amount to each of the one or more designated accounts. The entity can also cause third party matching funds to be transferred into the one or more designated accounts, such as, for example, charitable accounts, thereby matching at least portions of the calculated additional amount.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for using a money management card. In particular, the present invention relates to transferring funds to designated accounts through the use of a money management card. An entity, such as, for example, a card issuer, receives a user designation of one or more designated accounts that are to receive at least a portion of any additional amount added to purchases made using the money management card. The entity receives an indication that a user has used the money management card to make a purchase for a specified purchase amount subsequent to receiving the user designation. The entity adds a calculated additional amount to the specified purchase amount. The calculated additional amount can be based at least in part on the specified purchase amount or can be a pre-calculated amount that is added based on the fact a purchase was made. The entity transfers an appropriate portion of the calculated additional amount to each of the one or more designated accounts. The entity can also cause third party matching funds to be transferred into the one or more designated accounts, such as, for example, charitable accounts, thereby matching at least portions of the calculated additional amount.

Figure 1:
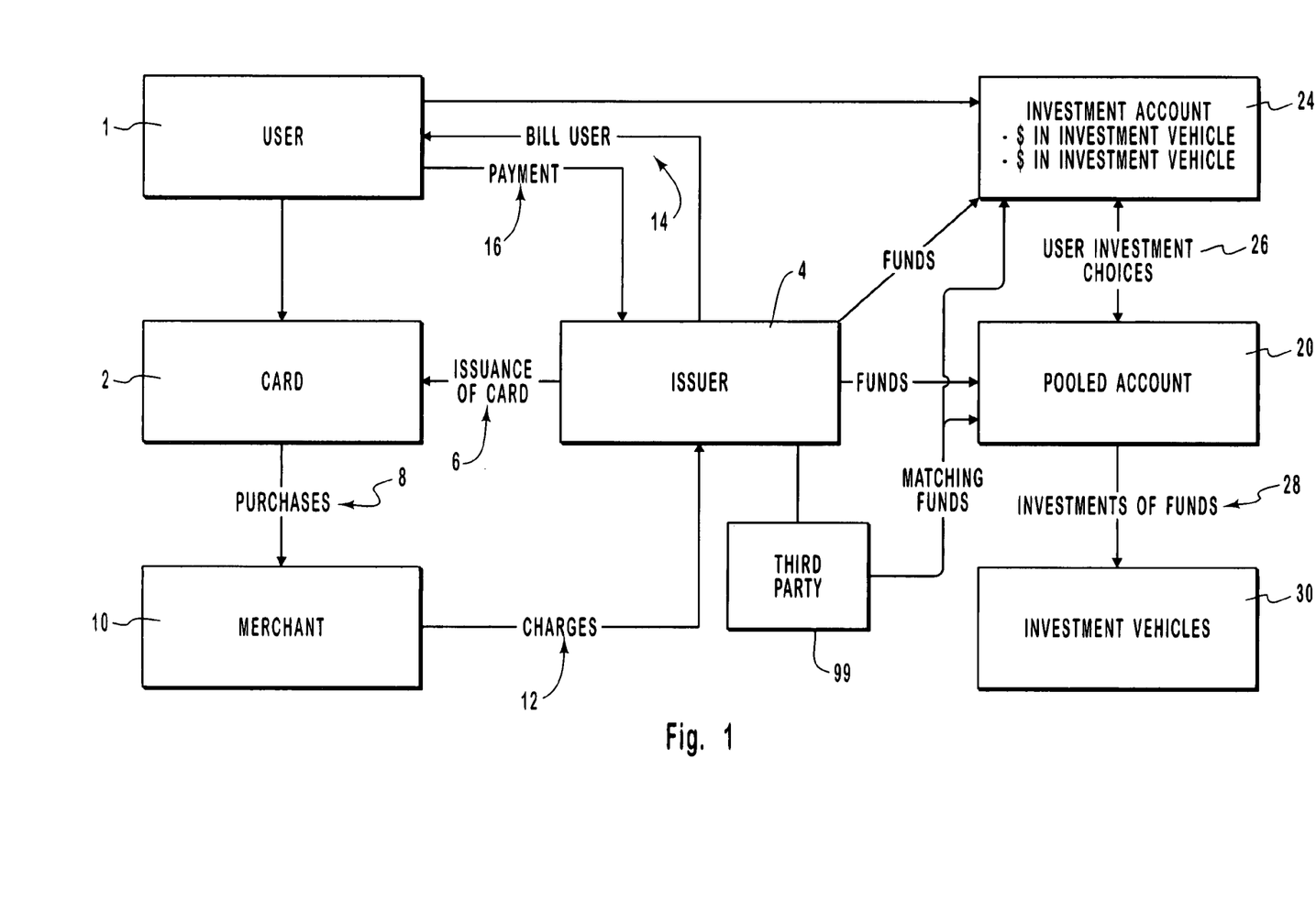
FIG. 1 is a block diagram of an illustrative embodiment of the present invention illustrating an environment in which a money management card is utilized as an investment vehicle.

With reference now to FIG. 1 there is shown a block diagram of an illustrative embodiment of the present invention illustrating a method by which the money management card is utilized as an investment vehicle. In the method there is shown a user 1, a card 2, and an issuer 4. The user of the present invention can be an individual consumer, couple, family, business, organization, or other user that typically utilizes money management cards. The issuer 4 can be any company, financial institution, or other entity that offers services in connection with a money management card. The issuance of card 6 by issuer 4 provides user 1 access to, and use of, card 2.

Utilizing card 2, the user makes purchases 8 from a merchant 10. Merchant 10 can be any business, organization, firm, or individual that accepts a money management card as a form of payment for goods, services, or other items. The purchase amount is then accumulated with other purchase amounts as a series of charges 12 which are then billed to issuer 4. The purchase amount can include both the cost of the goods and/or services and any permissible additional charges such as sales tax or other fees.

Once received by issuer 4, issuer pays merchant 10 for charges 12 corresponding to the purchase amount. The charges 12 are recorded in a user charge account. The charge account is utilized to track purchases 8 made utilizing card 2. A purchase amount is maintained in the charge account corresponding to purchases 8. The issuer utilizes the purchase amount to calculate an additional amount to be added to the purchase amount. The issuer sends user 1 a bill 14 for an amount associated with the use of card 2. The user sends issuer 4 a full or partial payment 16 in response to bill 14. It will be understood that the current method may be further adapted to an instance of a debit card where in lieu of steps relating to payment in response to a bill, the payment step is merely replaced by appropriate authorization to debit the users account in response to a specific charge.

The additional amount added to the purchase amount can be determined using a variety of methods. In one embodiment of the present invention, a single method of calculating an additional amount is utilized for all users. In an alternative method of the present invention, a plurality of methods of calculating the additional amount are provided. The method used to calculate the additional amount can be determined by the issuer. Alternatively, the user can select a method to calculate the additional amount from the plurality of methods of calculating the additional amount. The additional amount can be calculated for each transaction, for more than one transaction, or for purchase amount totals for a given billing cycle. The additional amount can be calculated based on a set dollar amount, a percentage of the purchase amount, or a variable percentage of the purchase amount that varies depending on purchase amount totals. In some embodiments, the additional amount is a fixed amount that is to be added to a purchase as a result of the purchase being made and independent of the purchase amount.

In one embodiment of the present invention the additional amount is funded by the user. In this embodiment, the issuer bills the user for the purchase amount and the additional amount. The issuer of the card is authorized by the user to add the additional amount to the purchase amount. The issuer can bill the user for the purchase amount and the additional amount in a single statement. Alternatively, the purchase amount and the additional amount can be billed separately. Where the additional amount is funded by the user, payment comprises payment of the purchase amount and the additional amount.

In an alternative embodiment of the present invention, the additional amount or portion thereof is funded by the issuer, the manager, a merchant, a corporation, or a person. In this embodiment billing and payment may only be for the purchase amount. That is, a user of a money management card is billed for the purchase amount and some reduced amount (or none) of the additional amount. The issuer, the manager, the merchant, the company or the person is billed for the remaining portion (or all) of the additional amount.

While the present invention is discussed primarily with reference to additional amounts and purchase amounts, it will be understood that charges associated with typically money management cards are not limited to purchase amounts and additional amounts. Money management cards may utilize other charges such as interest charges, late charges, financing charges and the like. The focus on additional amounts and purchase amounts is used to more clearly focus on the inventive aspects of the present invention.

Further, it may be that some other third party designates a matching amount that matches a portion of an additional amount, for example, that is to be transferred to a charitable account. A matching amount can be billed to the third party that designates the matching amount. Matching amounts can be designated as a percentage of a purchase amount, percentage of an additional amount, or can fixed amounts per purchase. Thus, it may be that when a purchase is made with a money management card an additional amount (funded by a user and/or some other entity) and a matching amount (fund by another third party) are transferred to one or more accounts.

Payment of the purchase amount is utilized to satisfy charges of the charge account. The funds from the additional amount (and any matching amount) are placed in an investment account 24 that are placed in pooled account 20. Alternatively, the issuer could place the additional amount (and any matching amount) directly either into investment account 24 or pooled account 20. For example, as depicted in FIG. 1, issuer 4 can transfer funds to investment account 24 and/or to pooled account 20. Similarly, third party 99 can transfer matching funds to investment account 24 and/or to pooled account 20. Upon crediting the additional amount (and any matching amount) to an investment account 24, the user conducts investment choice 26 to determine the allocation of the balance of investment account 24 in one or more investment vehicles 30. In the preferred embodiment of the present invention, investment account 24 includes a balance that comprises funds from all additional amounts paid by user 1 (and any matching amounts).

The funds of pooled account 20 are invested in investment vehicles 30. The pooled account 20 can be comprised entirely of funds from user investment accounts. Alternatively, the pooled account can also be comprised of funds from other sources, such as funds provided by the issuer, other investors, or similar sources.

The pooled account is administered by a manager. The manager of the pooled account invests the funds of the pooled account in investment vehicles. The manager of the pooled account can be the issuer, a company related to the issuer, an aggregator, an individual, or any person or entity that performs administration functions with respect to the pooled account and/or the individual investment accounts through an arrangement with the issuer of the money management card. In one embodiment of the present invention, the manager comprises a third party aggregator that offers the investment account associated with the pooled account to a user and/or issuer. The third party aggregator can offer products and services to the user and/or issuer independently of the products and services offered by the issuer. In an alternative embodiment, the issuer interfaces directly with user to offer the products and/or services provided indirectly from the third party aggregator.

In one embodiment of the present invention the additional amount (and any matching amount) is placed in the investment account 24. The placing of the additional amount (and any matching amount) in an investment account can entail adjusting a balance of the investment account based on the placement of the additional amount (and any matching amount) in the investment account. The investment account 24 has a plurality of investment vehicles. In one embodiment of the present invention the plurality of investment vehicles associated with the investment account are selected by the user. The user designates a portion of the additional amount (and any matching amount) to be placed into at least one of said plurality of investment vehicles. Any amount can be placed into an investment vehicle. The user is not required to satisfy a minimum amount before placing said portion of the (and any matching amount) amount into one of the plurality of investment vehicles. The user is not required to satisfy a minimum amount due to the pooling of the additional amount (and any matching amount) with additional amounts (and any matching amounts) of other users. The additional amount (and any matching amount) placed in each of the plurality of investment vehicles is pooled with portions of the additional amounts (and any matching amount) of other users placed into the investment vehicles.

As previously mentioned, the user allocates the balance of the investment account to one or more of the plurality of investment vehicles. This can be accomplished in a variety of methods within the scope and spirit of the present invention. For example, the user can allocate the balance of the investment account by designating percentages of the investment account to be invested in one or more of the investment vehicles. The balance of the investment account can also be allocated based on dollar amounts to be invested in the investment vehicles. The allocation of the balance of the investment account can also be based on allocation recommendations provided by the manager or some third party advisor. Allocation recommendations can be presented in a variety of forms including investment packages, recommendations of high performance investment vehicles, recommendations based on designated investment strategies, or the like. In one embodiment, the user selects one of a plurality of allocation recommendations to allocate the balance of the investment account.

Figure 2:
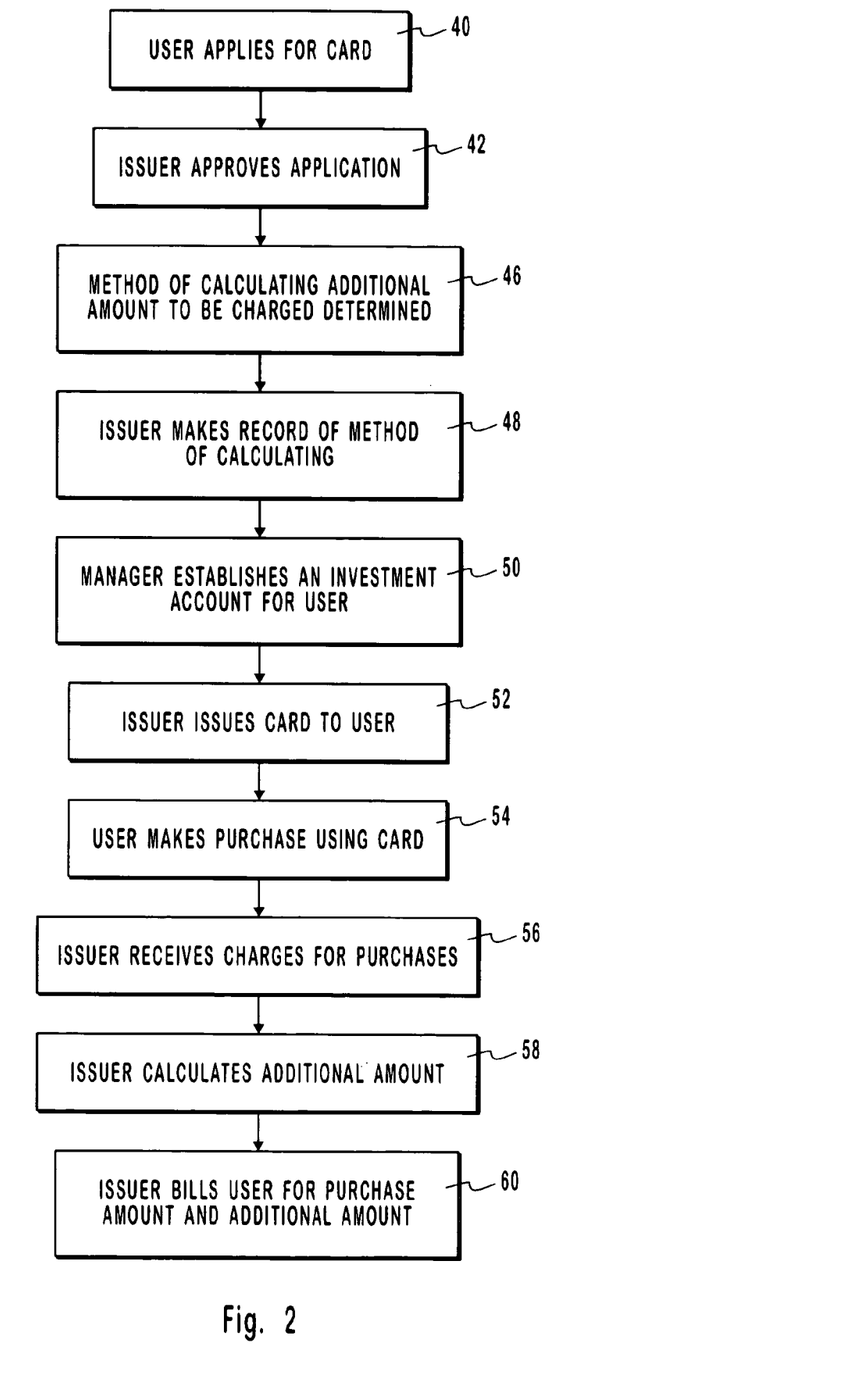
FIG. 2 is a flow diagram of an illustrative embodiment of the present invention showing a method by which a card is utilized to charge an additional amount to a user.

With reference now to FIG. 2 there is shown a flow diagram of an illustrative embodiment of the present invention showing the method by which a card is utilized to charge an additional amount to a user. In the method, the user applies for a card in step 40. Based on the application, the issuer approves the application in step 42. Once the application is approved, the method of calculating the additional amount to be charged is determined in step 46. As previously mentioned, the user or the issuer can select from a variety of methods of calculating the additional amount. Once the method of calculating the additional amount is determined, the issuer makes a record of the method of calculating the additional amount in step 48.

Methods for calculating matching third party amounts can also be determined when an application is approved. Alternately, matching third party amounts are added and/or removed after a card is issued based on the desires of the matching third party. For example, it may be that some other third party designates a matching amount that matches a portion of an additional mount, for example, that is to be transferred to an investment account or pooled account. A matching amount can be billed to the third party that designates the matching amount. Matching amounts can be designated as a percentage of a purchase amount, percentage of an additional amount, or can fixed amounts per purchase. Thus, it may be that when a purchase is made with a money management card an additional amount (funded by a user and/or some other entity) and a matching amount (funded by the third party) are transferred to an investment account or pooled account.

An investment account is established for the user in step 50. The card is issued to the user in step 52. Once the card is issued to the user, the user makes purchases using the card in step 54. Subsequent to the purchases being made, the issuer receives charges for the purchases in step 56. The issuer uses the charges received and the method of calculating to calculate the additional amount in step 58. Any matching amount can also be calculated. In the present embodiment, the issuer bills the user for the purchase amount and the additional amount in step 60.

The illustrated method demonstrates how a user can utilize the card as a forced savings mechanism. The user selects the method of calculating additional amounts before the card is issued. Once the user begins making purchases using the card, the issuer bills the user for an additional amount in addition to the purchase amount. The additional amount or portion thereof then can be placed in a forced saving and/or investment account by the issuer and/or manager.

Figure 3:
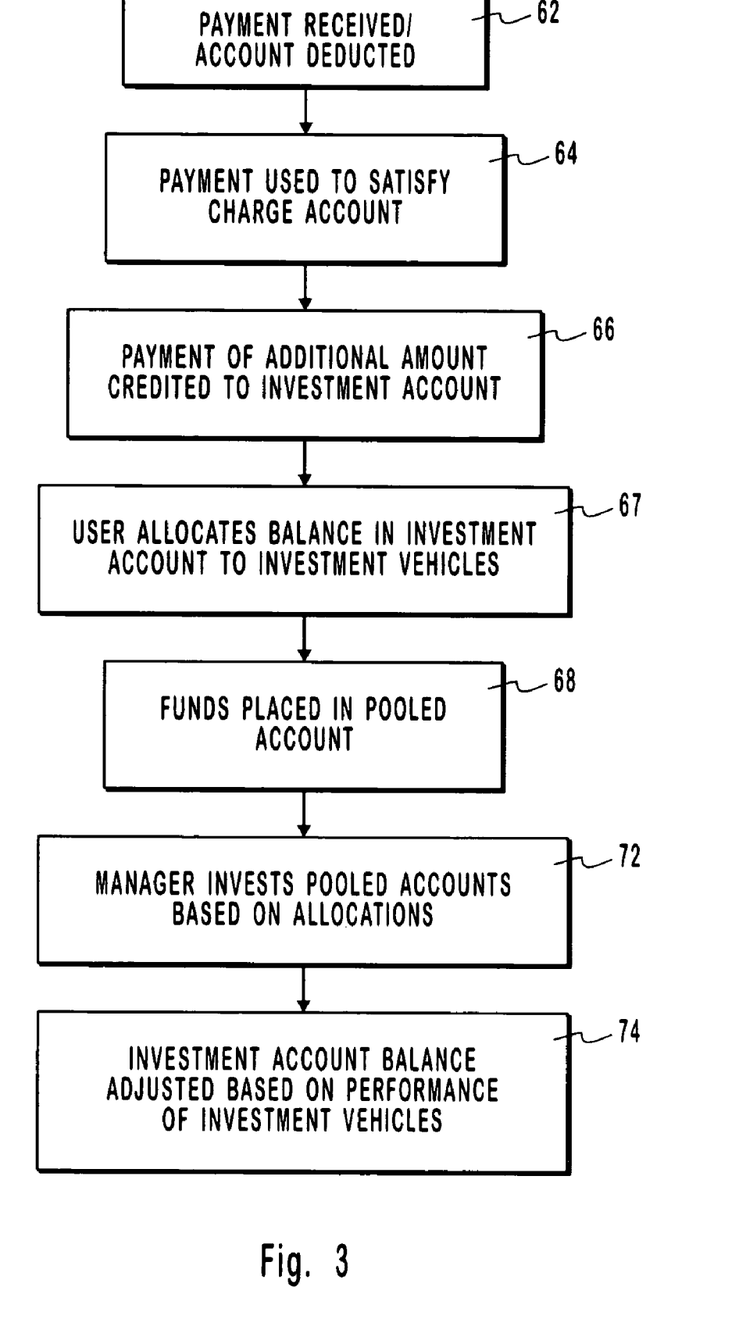
FIG. 3 is flow diagram illustrating a method by which an additional amount is utilized with a user's investment account and a pooled account.

FIG. 3 is flow diagram illustrating a method by which an additional amount is utilized with a user investment account and a pooled account as a method of saving and/or investing the additional amount. In the method, a payment is received from the user in step 62 or directly deducted from a user's account in the case of a debit card. Once the payment is received, the portion of the payment corresponding to the purchase amount is used to satisfy the charge account in step 64. The payment of the additional amount is credited to the user's investment account in step 66. In an alternative embodiment, the issuer could authorize the crediting to the user's investment account prior to receiving payment for the purchase amount, in essence loaning the user the funds credited.

The user allocates the balance in the user's investment account to one or more investment vehicles in step 67. The allocated balance of the investment account is then placed in the pooled account in step 68. The manager invests the pooled account based on the direction of user allocations in step 72. The user's balance of the investment account is adjusted based on the performance of the investment vehicles to which the user allocated the balance of the investment account in step 74.

By utilizing a pooled account the user is not required to satisfy a minimum amount before a portion of the additional amount (and any matching amount) is placed in one or more of the investment vehicles. The cumulative amount from the pooled account invested in each investment vehicle is sufficient to satisfy the minimum requirements normally associated with such investment vehicles. The investment account of each user allows the portion of the pooled account belonging to the user to be tracked. The investment accounts also allow the users to select where to invest the balance of the investment account among the plurality of investment vehicles. Additionally, the balance of the investment account can be adjusted based on the performance of the investment vehicles in which the user allocates the balance of the investment account.

For example, a user having only 50 dollars in an investment account can allocate 10% portions of the 50 dollars ($5) be invested in each of 10 investment vehicles. Each of the investment vehicles in the example has a minimum dollar requirement of 1,000 dollars before permitting an investment to be placed in the vehicle. The five dollars allocated by the user to each investment vehicle is actually a portion of the more than 1,000 dollars from the pooled account invested in each of the investment vehicles. The investment account allows the issuer, manager and/or user to designate an investment of less than the investment vehicle minimums while also permitting tracking of the investment. If the stock in one investment vehicle experiences one percent growth during a month, then $5.05 is credited to the investment account to adjust the balance of the investment account. The performance of the other investment vehicles is also used to adjust the balance of the investment account. The adjusted balance can then be reinvested based on previously selected allocations or alternatively based on reallocation of the adjusted balance.

Figure 4:
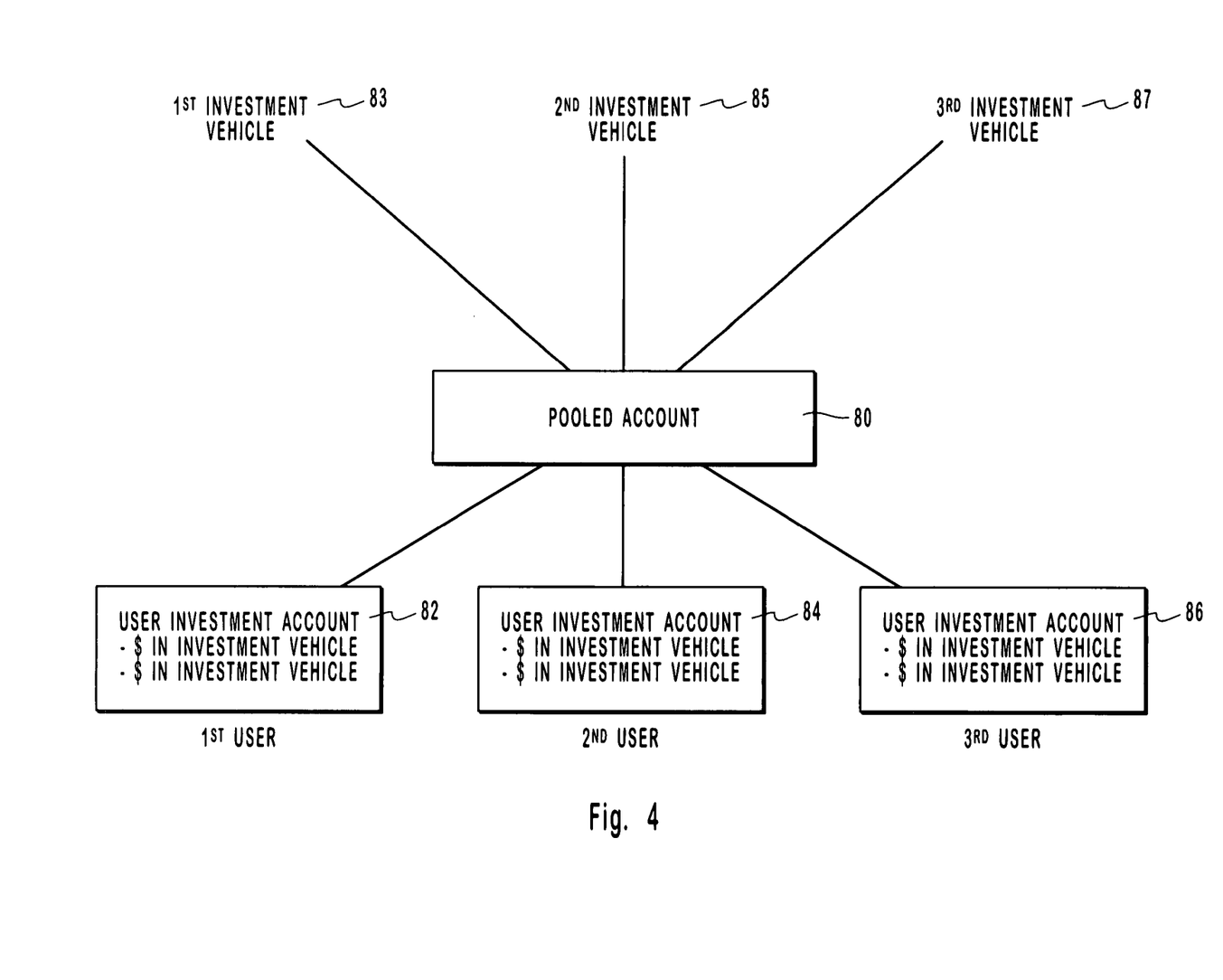
FIG. 4 illustrates how a pooled account is utilized with multiple user investment accounts to invest funds in investment vehicles.

FIG. 4 illustrates how a pooled account is utilized with multiple user investment accounts to invest in a plurality of investment vehicles. Pooled account 80 corresponds with a plurality of investment accounts. In the illustrated embodiment, the plurality of investment accounts are represented by a user investment account of a first user 82, a user investment account of a second user 84, and a user investment account of a third user 86.

The pooled account 80 is also associated with a plurality of investment vehicles. The plurality of investment vehicles are represented by $1^{st}$ investment vehicle 83, $2^{nd}$ investment vehicle 85, and $3^{rd}$ investment vehicle 87. The funds of pooled account 80 are invested in investment vehicles 83, 85, and 87. The user is provided with a plurality of investment vehicles to which the balance of the investment accounts 82, 84, 86 can be allocated. In the illustrated embodiment the balances of each of the user investment accounts 82, 84, 86 are allocated to one or more of the plurality of investment vehicles.

The plurality of investment vehicles associated with the pooled account 80 does not necessarily represent the same investment vehicles as the plurality of investment vehicles associated with investment accounts 82, 84, 86. Neither are the same investment vehicles necessarily provided to the investment accounts 82, 84, 86. In one embodiment of the present invention the plurality of investment vehicles provided to the user comprises the same investment vehicles in which the funds of the pooled account are invested. In an alternative embodiment, the plurality of investment vehicles provided to the user is a subset of the plurality of investment vehicles in which the funds of the pooled account are invested. The plurality of investment vehicles provided to the user can be selected particularly for the user. The investment vehicles can be selected based on the investment needs of the user, biographical data of the user, and/or other criteria tailored to the user.

The issuer can invest the funds of the pooled account 80 based on any of a variety of criterion. The issuer can invest the funds of the pooled account in one or more investment vehicles based the users' investment decisions. For example, the pooled account can be invested based on the investment vehicles to which users allocate the balance of their investment accounts. The funds can be invested based in whole or in part on the user allocation decisions. For example, in the event that users allocate an aggregate amount of 150,000 dollars to a given investment fund, where the funds are invested based in whole on the user allocation decisions, the manager will invest funds from the pooled accounts in the amount of 150,000 dollars.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media, can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
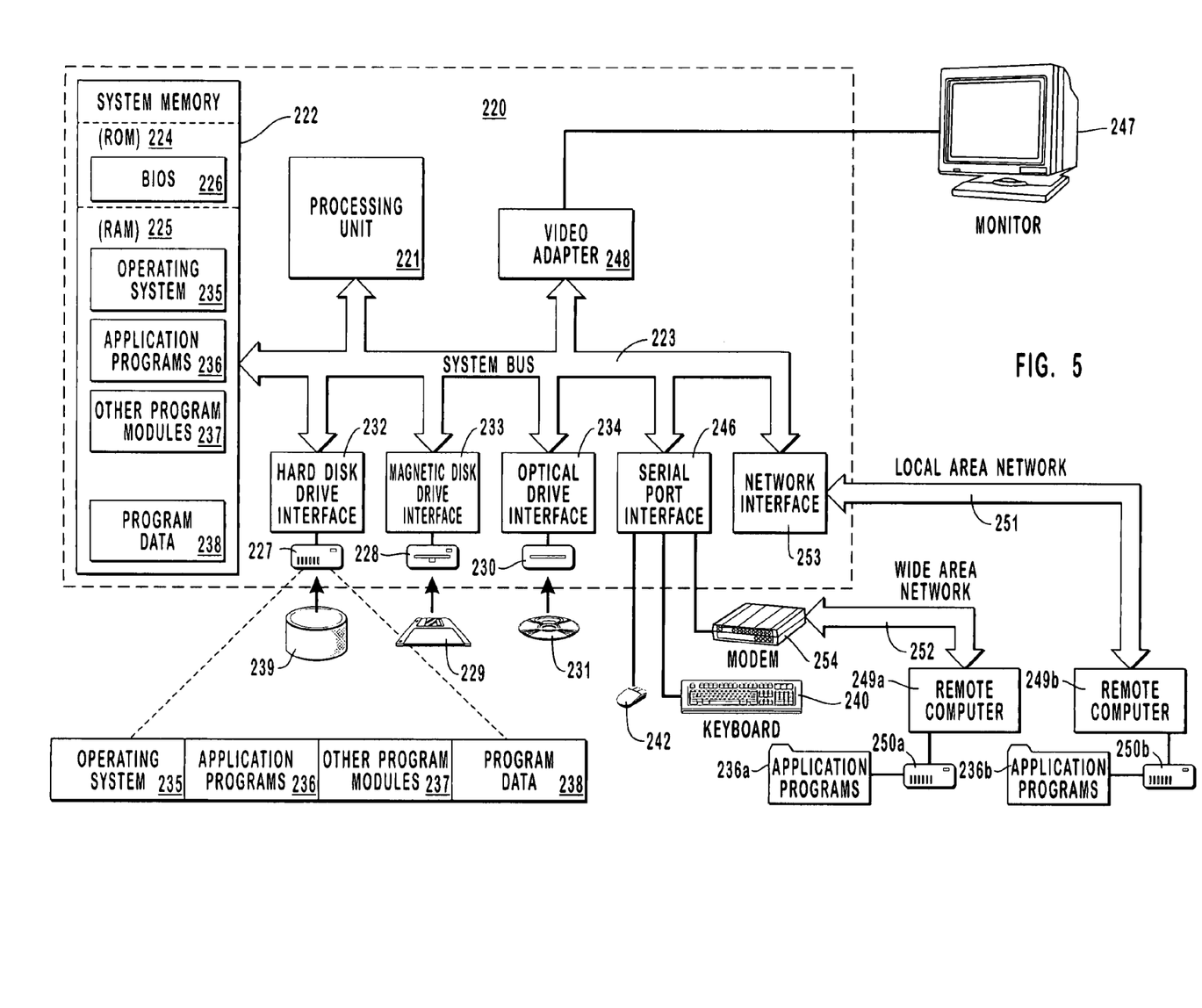
FIG. 5 is a block diagram of an illustrative operating environment in which the present invention can be implemented.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods that were disclosed above. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 224.

The computer 220 may also include a magnetic hard disk drive 227 for reading from and writing to a magnetic hard disk 239, a magnetic disk drive 228 for reading from or writing to a removable magnetic disk 229, and an optical disk drive 230 for reading from or writing to removable optical disk 231 such as a CD-ROM or other optical media. The magnetic hard disk drive 227, magnetic disk drive 228, and optical disk drive 230 are connected to the system bus 223 by a hard disk drive interface 232, a magnetic disk drive-interface 233, and an optical drive interface 234, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 239, magnetic disk 229, optical disk 231, ROM 24 or RAM 225, including an operating system 235, one or more application programs 236, other program modules 237, and program data 238. A user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 246 coupled to system bus 223. Alternatively, the input devices may be connected by other interfaces, such as a parallel port, a game port or a universal serial bus (USB). A monitor 247 or another display device is also connected to system bus 223 via an interface, such as video adapter 248. In addition to the monitor, personal computers typically include other peripheral output devices (not shown), such as speakers and printers.

The computer 220 may operate in a networked environment using logical connections to one or more remote computers, such as remote computers 249a and 249b. Remote computers 249a and 249b may each be another personal computer, a server, a router, a network PC, a peer device or other common network node, and typically include many or all of the elements described above relative to the computer 220, although only memory storage devices 250a and 250b and their associated application programs 236a and 236b have been illustrated in FIG. 5. The logical connections depicted in FIG. 5 include a local area network (LAN) 251 and a wide area network (WAN) 252 that are presented here by way of example and not limitation. Such networking environments are commonplace in office-wide or enterprise-wide computer networks, intranets and the Internet. When used in a LAN networking environment, the computer 220 is connected to the local network 251 through a network interface or adapter 253. When used in a WAN networking environment, the computer 220 may include a modem 254, a wireless link, or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing communications over wide area network 52 may be used.

Figure 6:
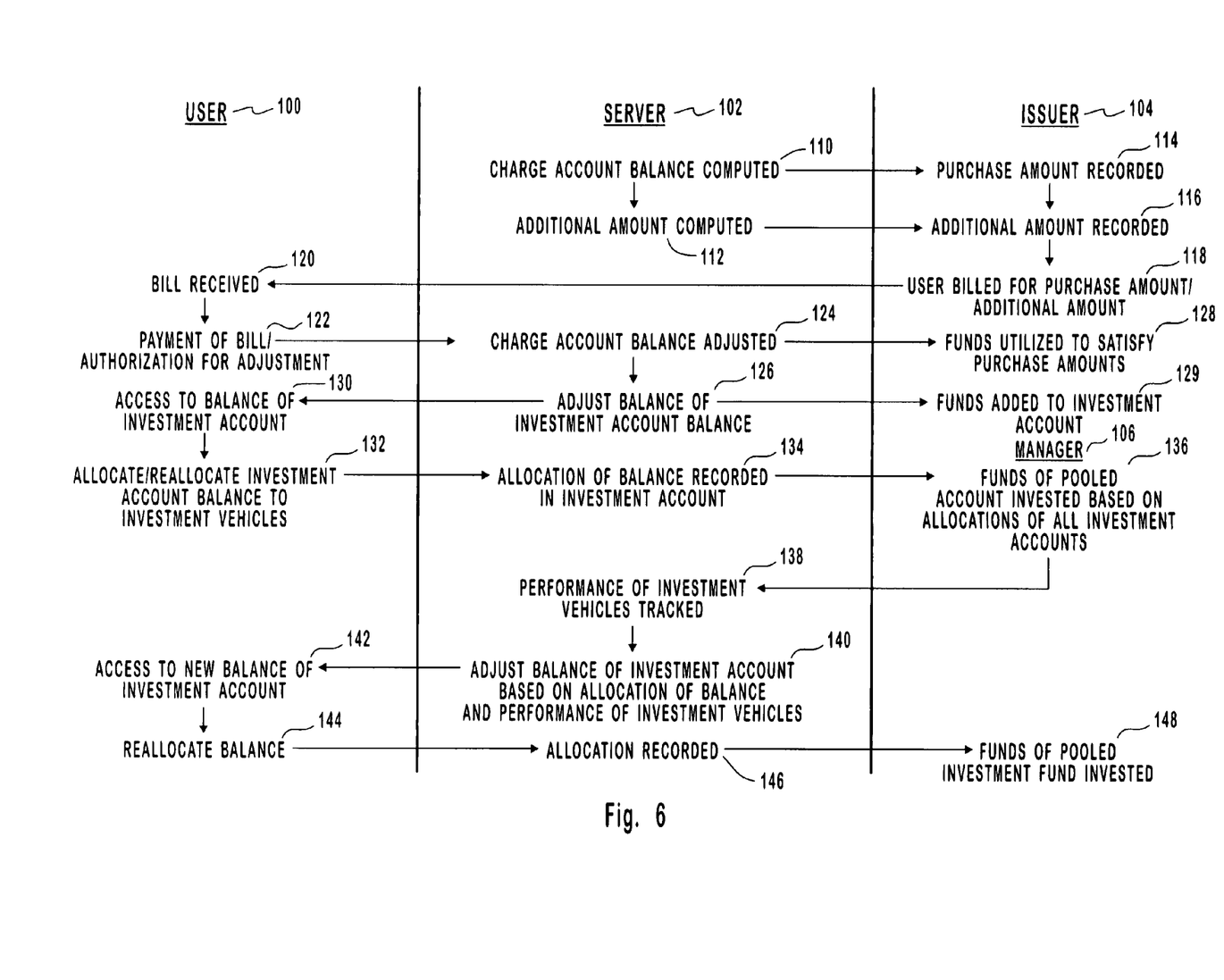
FIG. 6 illustrates an embodiment of the present invention in which a server is utilized with the money management card to facilitate investment of an additional amount charged to a user.

FIG. 6 illustrates an embodiment of the present invention in which a server is utilized with the money management card to facilitate investment of the additional amount (and any matching amount). There is shown how the steps relate to a user 100, a server 102, and an issuer 104. In the method, an account balance of the charge account representing the purchase amount totals is computed by server 102 in step 110. Once the account balance of the charge account is computed, an additional amount is computed by server 102 in step 112. The purchase amount totals are recorded by issuer 104 in step 114. The additional amount is recorded by issuer 104 in step 116. Based on the purchase amounts recorded and the additional amount recorded, the user is billed for the purchase amounts and additional amount by the issuer 104 in step 118.

The bill is received by user 100 in step 120. Once the bill is received, payment of bill is tendered by user 100 in step 122 or authorization for adjustment given in the event of a loan from an issuer. The charge account balance is then adjusted by server 102 in step 124 based on the portion of the payment corresponding to the purchase amount. The balance of the investment account is also adjusted by server 102 based on the portion of the payment corresponding to the additional amount in step 126 (and any matching amount) In an alternative embodiment (not shown) the adjustment of investment account can be made by server 102 prior to the portion of payment corresponding to the purchase amount or in the event of a debit card, the adjustment of investment account can be made upon authorization to deduct a users account. Funds from payment of the purchase amount are utilized by issuer 104 to satisfy the purchase amount in step 128. Funds from payment or authorization of the additional amount (and any matching amount) are added to the investment account in step 129.

Access to the balance of the investment account is provided to user 100 in step 130. By accessing the balance of the investment account user 100 is able to allocate/reallocate the balance to one or more investment vehicles in step 132. The allocation of the balance of the investment account is recorded by server 102 in step 134. This allows the user to view the allocations at any time by simply accessing the investment account.

The funds of the pooled account are invested in the investment vehicles by manager 106 based on the allocations of all investment accounts as recorded by the server in step 136. It will be understood that even though FIG. 6 depicts issuer 104 and manager 106 as separate entities, the functions of manager 106 could also be performed by issuer 104. The performance of the investment vehicles is tracked by server 102 in step 138. The server adjusts the balance of the investment account based on the allocation of the balance and the performance of the investment vehicles in step 140.

User 100 is provided with access to the new balance of the investment account in step 142. By accessing the new balance, the user can reallocate the balance in step 144. The allocation of the balance is recorded by the server in step 146. Manager can invest the funds of the pooled account based on the allocation of the balance of the investment accounts in step 148.

The system charges the user an additional amount to the purchase amount. Upon receipt of payment of the additional amount, funds from the payment of the additional amount are placed in an investment account. Alternatively, funds may be placed in the investment account prior to the payment corresponding to the additional amount (and any matching amount) in the event the issuer desires to loan the user funds or may be made to the investment account upon authorization to deduct a user's account in the event of a debit card. The balance of the user investment account is adjusted based on the payment of the additional amount (and any matching amount). The user allocates the balance of the investment account to one or more investment vehicles. By monitoring the performance of the investment vehicles, the balance of the investment account is adjusted based on the performance of the investment vehicles to which the balance of the investment account is allocated. This allows the user to utilize the money management card as a forced savings and investment mechanism.

The use of the money management card also permits the user to utilize the balance of the investment account for other uses. For example, the user can transfer a portion of the funds held in the user investment account to an investment account of another individual. The person to whom the portions of the funds are transferred can be another cardholder or a non-cardholder, such as a spouse, child, or friend. Such transfers can be made for charitable, tax, or other purposes as determined by the user. Additionally, a separate investment account for the individual to whom the transfer is being made can be created and maintained by the new user, issuer, manager, financial advisor, third party investment manager or anyone able to perform the system. A variety of uses and configurations of the card, user charge account, user debit account, investment account, pooled account, and investing mechanisms are possible within the scope and spirit of the present invention.

In some embodiments, funds from additional amounts charged to a money management card (and any matching amounts) are subsequently transferred from an investment account to one or more other types of accounts. For example, in accordance with a user's designation, at least a portion of funds from an investment account can be transferred to one or more of a charitable account, a tax account, a tithing account, a savings account, a debt account, an electronic bill pay account, or some other account having a non-investment purpose.

In other embodiments, funds from additional amounts charged to a money management card (and any matching amounts) are transferred into a non-investment holding account and the funds are subsequently transferred to one or more other types of accounts. In these other embodiments, a user may allow funds from additional amounts charged to a money management card (and any matching amounts) to accumulate until a specified event, such as, for example, expiration of a specified period of time or obtaining a requisite amount of funds, occurs. In response to occurrence of the specified event, the user can designate how at least a portion of the funds in the non-investment holding account are to be transferred to one or more other types of accounts.

In yet other embodiments, a user pre-designates how funds are to be transferred to one or more other types of accounts. Then, when additional amounts are charged to a money management card, the additional amounts (and any matching amounts) are transferred directly to one or more other types of accounts in accordance with the user's designations and, without first having to be transferred into an investment account or into a non-investment holding account.

Figure 7:
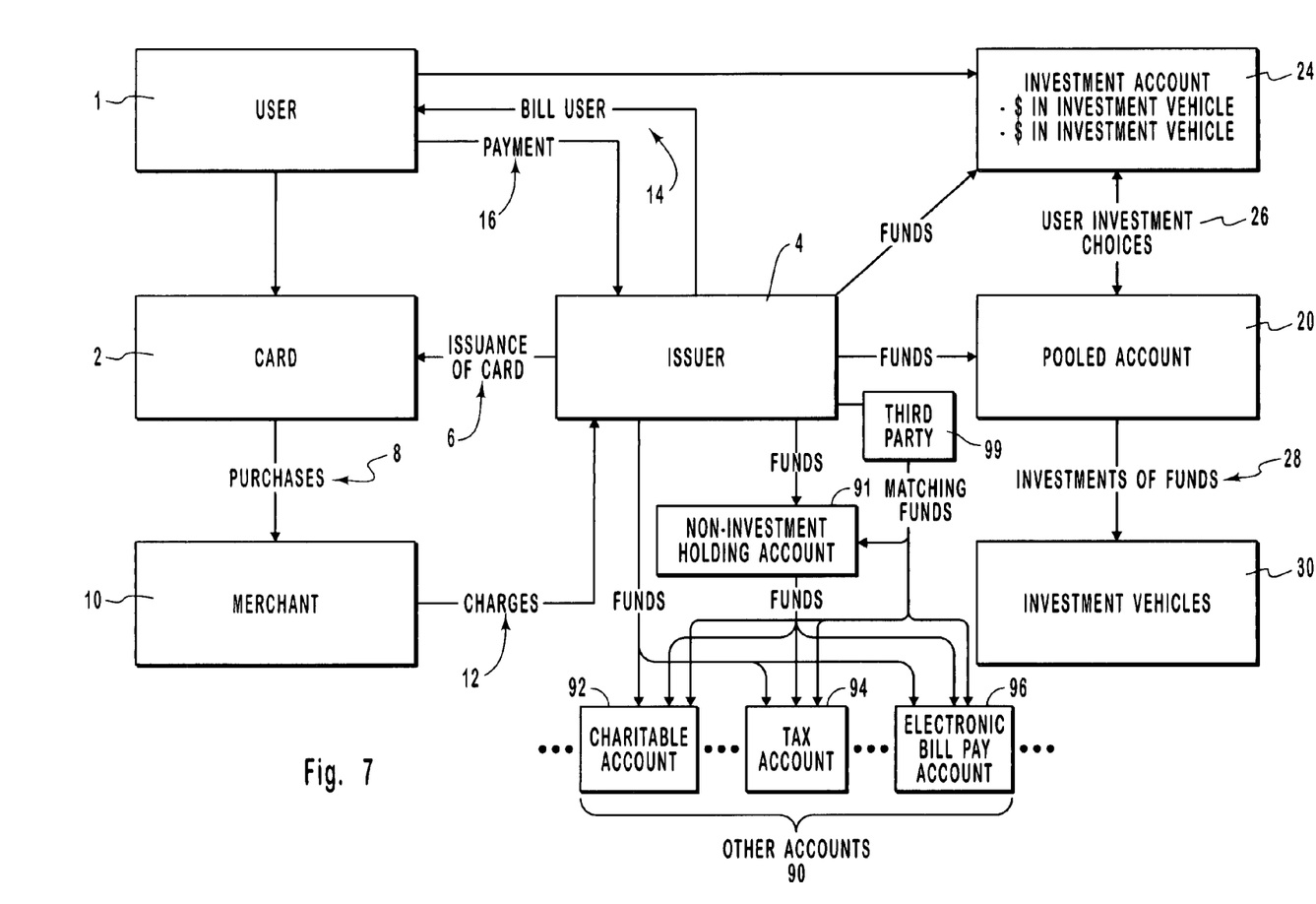
FIG. 7 illustrates an example architecture that can be used to transfer funds to one or more designated accounts.

FIG. 7 illustrates an example architecture similar to that of FIG. 1 that can be used to transfer funds to one or more designated accounts. FIG. 7 differs from FIG. 1 at least in that it includes non-investment holding account 91 and other accounts 90. Included in other accounts 90 can be any number of accounts, such as, for examples charitable account 92, tax account 94, and electronic bill pay account 96. A series of two periods (an ellipsis) indicates that other accounts can be included before, between, and after the expressly depicted accounts. It should also be understood that other accounts 90 can include a plurality of the same type of account. For example, other accounts 90 can include two savings accounts, three electronic bill pay accounts, etc.

Thus, depending on a user's designation, when an additional amount is charged to a money management card, issuer 4 can transfer at least portions of the additional amount to non-investment holding account 91, to any of other accounts 90, to investment account 24, or to pooled account 20. Issuer 4 can transfer funds in accordance with a user designation. At least a portion of finds transferred to non-investment account 91 and/or investment account 24 can subsequently be transferred to any of other accounts 90 (also in accordance with a user designation).

Accordingly, it may be that the additional charge amount is allocated between a number of other accounts by transferring a portion of the additional charged amount to each of the other accounts. For example, it may be that the first $20.00 of any additional charged amount is designated for transfer to electronic bill pay 9. If the additional charged amount is more than $20.00, any additional charged amount between $20.01 and $40.00 is designated for transfer to tax account 94. If the additional charged amount is more than $40.00, any additional charged amount over $40.00 is designated for transfer to charitable account 92.

Alternately, it may also be that an additional charged amount is allocated between a numbers of other accounts by percentage. For example, it may be that for any additional charged amount 10% of the additional charged amount is transferred to charitable account 92, 40% is transferred to tax account 94, and 50% is transferred to electronic bill pay account 96.

It should be understood that the described mechanisms for allocating an additional charged amount between one or more other accounts are merely examples. It would be apparent to one skilled in the art, after having reviewed this description, that other allocation mechanisms, in addition to allocation by amount and/or percentage, can be used. For example, issuer 4 may implement any number of different fund allocation schemes having varied complexity. Further, issuer 4 can allow users specify fund allocation in accordance with find allocation rules such that users can customize fund allocations to suit their individual needs.

Figure 8:
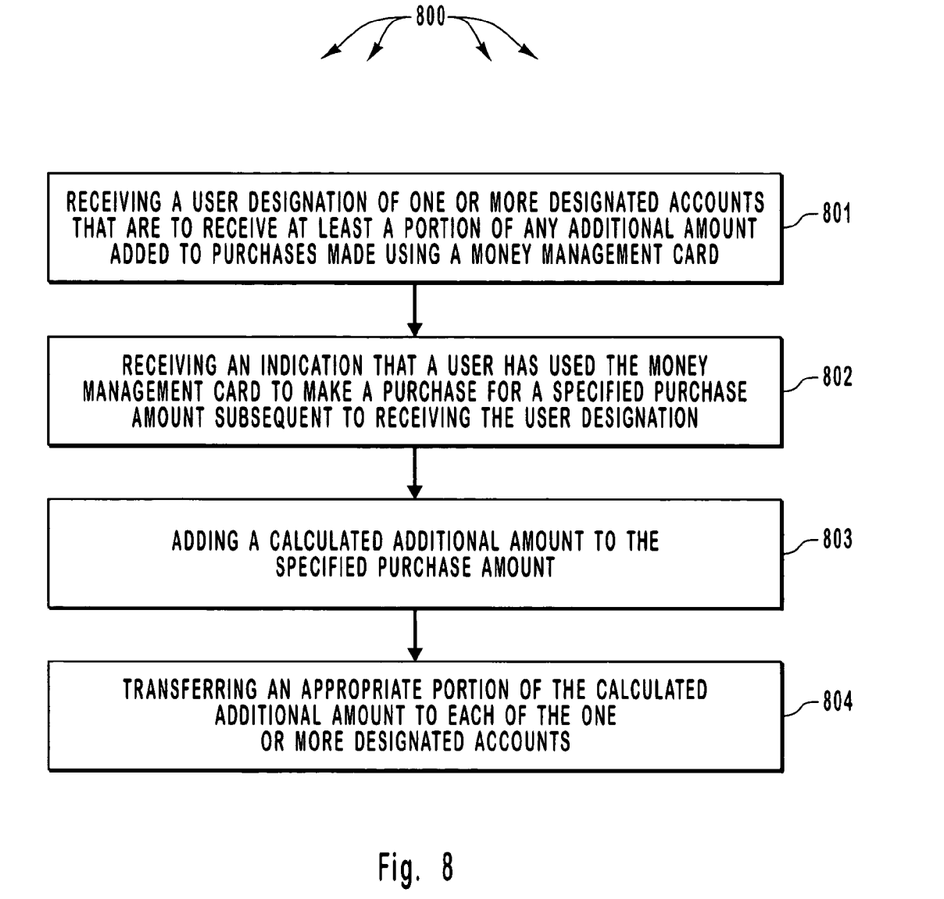
FIG. 8 is a flow chart illustrating an example method for transferring funds to one or more designated accounts.

FIG. 8 is a flow chart illustrating an example method 800 for transferring funds to one or more designated accounts. The method 800 will be described with reference to the modules in the architecture of FIG. 7.

Method 800 includes an act of receiving a user designation of one or more designated accounts that are to receive at least a portion of any additional amount added to purchases made using the money management account (act 801). For example, issuer 4 can receive a designation from user 1 designating that one or more accounts from other accounts 90 are to receive at least a portion of any additional amount added to purchases made using card 2. Alternately, issuer 4 can receive a designation that all additional amounts are to be transferred to non-investment holding account 91.

Method 800 includes an act of receiving an indication that a user has used the money management card to make a purchase for a specified purchase amount subsequent to receiving the user designation (act 802). For example, issuer 4 can receive an indication that card 2 was swiped at merchant 10 for the purpose of making a purchase having a specified dollar value.

Method 800 includes an act of adding a calculated additional amount to the specified purchase amount (act 803). For example, user 1 or issuer 4 can indicate an additional amount that is to be added to purchases 8 such that charges 12 is greater than purchases 8 by the additional amount. Mechanisms used to calculate an additional amount can be the same for all users or can vary among different users. Thus, any number of different mechanisms can be used to calculate an additional charged amount.

An additional amount can be calculated for each transaction, for more than one transaction, or for purchase amount totals for a given billing cycle. The additional amount can be calculated based on a set dollar amount, a percentage of the purchase amount, or a variable percentage of the purchase amount that varies depending on purchase amount totals. In some embodiments, an additional amount is a calculated percentage of a purchase amount that is calculated subsequent to (e.g., shortly after) a purchase. In other embodiments, an additional amount is a pre-calculated fixed amount that is added to purchase amounts as a result of a purchase being made and is independent of a purchase amount.

It may be that the additional amount is funded by the user. In these embodiments, the issuer bills the user for the purchase amount and the additional amount. The issuer of the card is authorized by the user to add the additional amount to the purchase amount. The issuer can bill the user for the purchase amount and the additional amount in a single statement. Alternatively, the purchase amount and the additional amount can be billed separately. Where the additional amount is funded by the user, payment comprises payment of the purchase amount and the additional amount.

Alternatively, it may also be that the additional amount or portion thereof is funded by the issuer, the manager, a merchant, a company or a person. In these alternative embodiments a user of a money management card is billed for the purchase amount and some reduced amount (or none) of the additional amount. The issuer, the manager, the merchant, the company or the person is billed for the remaining portion (or all) of the additional amount.

While the present invention is discussed primarily with reference to additional amounts and purchase amounts, it will be understood that charges associated with typically money management cards are not limited to purchase amounts and additional amounts. Money management cards may utilize other charges such as interest charges, late charges, financing charges and the like. The focus on additional amounts and purchase amounts is used to more clearly focus on the inventive aspects of the present invention.

Further, it may be that some other third party designates a matching amount that matches a portion of an additional mount, for example, that is to be transferred to one or more designated accounts (e.g., a charitable account). A matching amount can be billed to the third party that designates the matching amount. Matching amounts can be designated as a percentage of a purchase amount, percentage of an additional amount, or can fixed amounts per purchase. Thus, it may be that when a purchase is made with a money management card an additional amount (funded by a user and/or some other entity) and a matching amount are transferred to one or more accounts. For example, as depicted in FIG. 7, third party 99 can transfer matching funds non-investment holding account 91, charitable account 92, tax account 94, or electronic bill pay account 96.

Method 800 includes an act of transferring an appropriate portion of the calculated additional amount to each of the one or more designated accounts (act 804). For example, issuer 4 can transfer an appropriate portion of any additional amount added into charges 12 to one or more of other accounts 90. In some embodiments, issuer 4 transfers portions of a calculated amount directly to the other accounts (e.g., at or near the time of purchase). In other embodiments, issuer 4 transfers portions of a calculated amount from non-investment holding account 91 to one or more of other accounts 90 (e.g., in response to the occurrence of an event). Issuer 4 can transfer portions of a calculated amount in accordance with user designations received either before or after an additional amount is charged to a money management card.

In some embodiments, funds and/or matching funds transferred into a non-investment account or other account can be subsequently transferred into an investment account or pooled in a pooled account for later transfers to investment vehicles. For example, funds from non-investment holding account 91 and any of other accounts 90 can be transferred to investment account 24 and/or to pooled account 20 (and pooled for later transfers to investment vehicles 30). Funds can be transferred to investments in response to the occurrence of some event, such as, for example, receiving card user instructions, the balance of an account exceeding a specified amount, an account being dormant for a specified period of time, etc. Accordingly, a card user can flexibly control allocation of funds accumulated from the use of a money management card.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system wherein a credit card is used to charge a purchase amount for purchases, a method for allowing a user to save a specified savings amount when using the credit card by transferring a savings amount to one or more registered securities in response to using the credit card, the method comprising the computer-implemented acts of:

associating the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receiving from the user an indication of registered security allocations, the registered security allocations indicating how any separate savings amounts submitted on behalf of the user are to be invested in corresponding registered securities associated with the established investment account;

receiving an indication that the user has used the credit card to make a purchase for a specified purchase amount subsequent to receiving the user indication of the registered security allocations;

a computer adding a calculated separate savings amount to the specified purchase amount, the separate savings amount to be loaned to the user for investment in the user's indicated registered security allocations, the calculation of the separate savings amount triggered by the purchase, the separate savings amount based on the purchase amount of the purchase, the separate savings amount being less than the minimum investment amount for the user's indicated registered security allocations;

said computer loaning the separate savings amount to the user for investment in the user's indicated registered security allocations such that the loaned savings amount can be invested on behalf of the user prior to billing for payment for the loaned savings amount from the user, wherein the loaned savings amount is charged to the credit card along with the purchase amount and not as a charge associated with a separate credit account;

said computer transferring an appropriate portion of the loaned savings amount to the pooled account in the name of the user prior to receiving payment for the loaned savings amount so that the loaned savings amount can be pooled with the savings amounts of the other plurality of users issued cards associated with the savings program in order to meet the minimum investment amounts for the user's indicated registered securities; and said computer transferring at least a portion of the loaned savings amount into at least one of the user's indicated registered securities when it is determined that the value of the pooled account has reached the minimum investment amount required by the registered security.

2. The method of claim 1, further comprising: calculating the separate savings amount based on the specified purchase price.

3. The method of claim 1, further comprising: identifying the separate savings amount based on the purchase being made and independent of the purchase amount.

4. The method as recited in claim 1, wherein receiving an indication that the user has used the credit card to make a purchase comprises detecting that the credit card has been swiped.

5. The method as recited in claim 1, wherein adding a calculated separate savings amount to the specified purchase amount comprises adding a fixed amount to specified purchase price.

6. The method as recited in claim 5, wherein adding a fixed amount to specified purchase price comprises adding a fixed amount to the specified purchase amount based at least in part on the specified purchase price.

7. The method as recited in claim 5, wherein adding a fixed amount to specified purchase price comprises adding a fixed amount to the specified purchase amount as a result of the purchase being made and independent of the specified purchase amount.

8. The method as recited in claim 1, wherein adding a calculated separate savings amount to the specified purchase amount comprises adding a percentage of the specified purchase price to the specified purchase price.

9. The method as recited in claim 1, wherein adding a calculated separate savings amount to the specified purchase amount comprises adding a calculated separate savings amount that is to be funded by a user of the credit card.

10. The method as recited in claim 1, wherein adding a calculated separate savings amount to the specified purchase amount comprises adding a calculated separate savings amount that is to be funded by an entity selected from among an issuer, a merchant, a manager, a corporation, and a person.

11. The method as recited in claim 1, further comprising: billing a user of the credit card for the specified purchase price and the calculated separate savings amount in a single statement.

12. The method as recited in claim 1, further comprising: determining a matching amount that matches at least a portion of the calculated separate savings amount, the matching amount funded by a third party; and an act of transferring an appropriate portion of the matching amount to the pooled account.

13. A computer program product for use in a system wherein a credit card is used to charge a purchase amount for purchases, the computer program product for implementing a method for allowing a user to save a specified savings amount when using the credit card by transferring a savings amount to one or more registered securities in response to using the credit card, the computer program product comprising one or more computer readable storage media having stored thereon computer-executable instructions that, when executed by a processor, cause the system to perform the following:

associate the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receive the user an indication of registered security allocations, the registered security allocations indicating how any separate savings amounts submitted on behalf of the user are to be invested in corresponding registered securities associated with the established investment;

receive an indication that the user has used the credit card to make a purchase for a specified purchase amount subsequent to receiving the user indication of the registered security allocations;

add a calculated separate savings amount to the specified purchase amount, the separate savings amount to be loaned to the user for investment in the user's indicated registered security allocations, the calculation of the separate savings amount triggered by the purchase, the separate savings amount based on the purchase amount of the purchase, the separate savings amount being less than the minimum investment amount for the user's indicated registered security allocations;

loan the separate savings amount to the user for investment in the user's indicated registered security allocations such that the loaned savings amount can be invested on behalf of the user prior to billing for payment for the loaned savings amount from the user, wherein the loaned savings amount is charged to the credit card along with the purchase amount and not as a charge associated with a separate credit account;

transfer an appropriate portion of the loaned savings amount to the pooled account in the name of the user prior to receiving payment for the loaned savings amount so that the loaned savings amount can be pooled with the savings amounts of the other plurality of users issued cards associated with the savings program in order to meet the minimum investment amounts for the user's indicated registered securities; and transfer at least a portion of the loaned savings amount into at least one of the user's indicated registered securities when it is determined that the value of the pooled account has reached the minimum investment amount required by the registered security.

14. The computer program product as recited in claim 13, further comprising computer-executable instructions that, when executed, cause the system to calculate the separate savings amount based on the specified purchase price.

15. The computer program product as recited in claim 13, further comprising computer-executable instructions that, when executed, cause the system to identify the separate savings amount based on the purchase being made and independent of the purchase amount.

16. The computer program product as recited in claim 13, wherein computer-executable instructions that, when executed, cause the system to receive an indication that the user has used the credit card to make a purchase comprise computer-executable instructions that, when executed cause the system to detect that the credit card has been swiped.

17. The computer program product as recited in claim 13, wherein computer-executable instructions that, when executed, cause the system to add a calculated separate savings amount to the specified purchase amount comprise computer-executable instructions that, when executed cause the system to add a fixed amount to specified purchase price as a result of the purchase being made and independent of the specified purchase price.

18. The computer program product as recited in claim 13, wherein computer-executable instructions that, when executed, cause the system to add a calculated separate savings amount to the specified purchase amount comprise computer-executable instructions that, when executed cause the system to add a percentage of the specified purchase price to the specified purchase price.

19. The computer program product as recited in claim 13, wherein computer-executable instructions that, when executed, cause the system to add a calculated separate savings amount to the specified purchase amount comprise computer-executable instructions that, when executed cause the system to add a calculated separate savings amount that is to be funded by a user of the credit card.

20. The computer program product as recited in claim 13, wherein computer-executable instructions that, when executed, cause the system to add a calculated separate savings amount to the specified purchase amount comprise computer-executable instructions that, when executed cause the system to add a calculated separate savings amount that is to be funded by an entity selected from among an issuer, a merchant, a manager, a corporation, and a person.

21. The computer program product as recited in claim 13, further comprising computer-executable instructions that, when executed, cause the system to perform the following:
determine a matching amount that matches at least a portion of the calculated separate savings amount, the matching amount funded by a third party; and transfer an appropriate portion of the matching amount to the pooled account.

22. The computer program product as recited in claim 13, further comprising computer-executable instructions that, when executed, cause the system to bill a user of the credit card for the specified purchase price and the calculated separate savings amount in a single statement.

23. In a system wherein a credit card is used to charge a purchase amount for purchases, a method for allowing a user to save a specified savings amount when using the credit card by transferring a savings amount to an one or more registered securities in response to using the credit card, the method comprising the computer-implemented acts of:

associating the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receiving from the user an indication of registered security allocations, the registered security allocations indicating how any separate savings amounts submitted on behalf of the user are to be invested in corresponding registered securities associated with the established investment account receiving an indication that the user has used the credit card to make a purchase for a specified purchase amount subsequent to receiving the user indication of the registered security;

a computer calculating a separate savings amount to add to the specified purchase amount, the separate savings amount to be loaned to the user for investment in the user's indicated registered security allocations, the calculation of the separate savings amount triggered by the purchase, the separate savings amount based on the purchase amount of the purchase, the separate savings amount being less than the minimum investment amount for the user's indicated registered security allocations;

said computer loaning the separate savings amount to the user for investment in the user's indicated registered security allocations such that the loaned savings amount can be invested on behalf of the user prior to billing for payment for the loaned savings amount from the user, wherein the loaned savings amount is charged to the credit card along with the purchase amount and not as a charge associated with a separate credit account;

said computer determining a matching amount that matches at least a portion of the separate savings amount, the matching amount provided by a third party;

said computer transferring the sum of the loaned savings amount and the matching amount in the pooled account in the name of the user prior to receiving payment for the loaned savings amount so that the loaned savings amount and the matching amount can be pooled with the savings amounts of the other plurality of users issued cards associated with the savings program in order to meet the minimum investment amounts for the user's indicated registered securities;

said computer transferring at least a portion of the loaned savings amount and the matching amount into at least one of the user's indicated registered securities when it is determined that the value of the pooled account has reached the minimum investment amount required by the registered security.

24. The method as recited in claim 23, wherein calculating the separate savings amount to add to the purchase amount comprises calculating the separate savings amount as a percentage of the purchase amount.

25. The method as recited in claim 23, wherein calculating the separate savings amount to add to the purchase amount comprises identifying a fixed amount based on the purchase being made and independent of the purchase price.

26. The method as recited in claim 23, wherein calculating the separate savings amount to add to the purchase amount comprises calculating the separate savings amount that is to be funded by an entity selected from among an issuer, a merchant, a manager, a corporation, and a person.

27. A computer program product for use in a system wherein a credit card is used to charge a purchase amount for purchases, the computer program product for implementing a method for allowing a user to save a specified savings amount when using the credit card by transferring a savings amount to one or more registered securities in response to using the credit card, the computer program product comprising one or more computer readable storage media having stored thereon computer-executable instructions that, when executed by a processor, cause the system to perform the following:

associating the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receiving from the user an indication of registered security allocations, the registered security allocations indicating how any separate savings amounts submitted on behalf of the user are to be invested in corresponding registered securities associated with the established investment account receiving an indication that the user has used the credit card to make a purchase for a specified purchase amount subsequent to receiving the user indication of the registered security allocations;

calculating a separate savings amount to add to the specified purchase amount, the separate savings amount to be loaned to the user for investment in the user's indicated registered security allocations, the calculation of the separate savings amount triggered by the purchase, the separate savings amount based on the purchase amount of the purchase, the separate savings amount being less than the minimum investment amount for the user's indicated registered security allocations;

loaning the separate savings amount to the user for investment in the user's indicated registered security allocations such that the loaned savings amount can be invested on behalf of the user prior to billing for payment for the loaned savings amount from the user, wherein the loaned savings amount is charged to the credit card along with the purchase amount and not as a charge associated with a separate credit account;

determining a matching amount that matches at least a portion of the separate savings amount, the matching amount provided by a third party;

transferring the sum of the loaned savings amount and the matching amount in the pooled account in the name of the user prior to receiving payment for the loaned savings amount so that the loaned savings amount and the matching amount can be pooled with the savings amounts of the other plurality of users issued cards associated with the savings program in order to meet the minimum investment amounts for the user's indicated registered securities; and transferring at least a portion of the loaned savings amount and the matching amount into at least one of the user's indicated registered securities when it is determined that the value of the pooled account has reached the minimum investment amount required by the registered security.

28. The computer program product as recited in claim 27, wherein computer-executable instructions that, when executed, cause the system to calculate the separate savings amount to add to the purchase amount comprise computer-executable instructions that, when executed cause the system to calculate separate savings amount as a percentage of the purchase amount.

29. The computer program product as recited in claim 27, wherein computer-executable instructions that, when executed, cause the system to calculate the separate savings amount to add to the purchase amount comprise computer-executable instructions that, when executed cause the system to identify a fixed amount based on the purchase being made and independent of the purchase price.

30. The computer program product as recited in claim 27, wherein computer-executable instructions that, when executed, cause the system to calculate the separate savings amount to add to the purchase amount comprise computer-executable instructions that, when executed cause the system to calculate the separate savings amount that is to be funded by an entity selected from among an issuer, a merchant, a manager, a corporation, and a person.

* * * * *